United States Patent [19]
Hagenah

[11] 3,760,653
[45] Sept. 25, 1973

[54] PEDAL FOR BICYCLES

[75] Inventor: Hans-Gerhard Hagenah, Menden Sauerland, Germany

[73] Assignee: Union Sils, van de Loo & Co., Frondenberg, Germany

[22] Filed: Mar. 3, 1972

[21] Appl. No.: 231,683

[30] Foreign Application Priority Data
Mar. 12, 1971   Germany.................. P 21 11 891.2

[52] U.S. Cl. ............................................. 74/594.4
[51] Int. Cl. ............................................. B62m 3/08
[58] Field of Search ...................... 74/594.4, 594.1

[56] References Cited
UNITED STATES PATENTS
2,605,649   8/1952   Countryman ..................... 74/594.4

3,186,254   6/1965   Golden et al. ..................... 74/594.4

FOREIGN PATENTS OR APPLICATIONS
5,798   1/1898   Great Britain ..................... 74/594.4
1,375,934   9/1964   France ............................. 74/594.4

Primary Examiner—Charles J. Myhre
Assistant Examiner—F. D. Shoemaker
Attorney—Walter Becker

[57]   ABSTRACT

A pedal for bicycles and similar vehicles in which the frame means carrying the tread part is journalled on the pedal axle by friction and or antifriction bearings, in which the pedal axle is so designed as to be able selectively to mount antifriction and/or friction bearing means.

8 Claims, 8 Drawing Figures

PATENTED SEP 25 1973                                                3,760,653

PEDAL FOR BICYCLES

The present invention relates to a pedal for bicycles and similar vehicles in which the tread part is journalled on the pedal axle by means of ball bearings or friction bearings.

With pedals in which the tread part is journalled in ball bearings, it is known to screw connect counter bearings at the end portion of the pedal axle which is reduced in diameter. With pedals which have their tread part journalled on the pedal axle by means of friction bearings, it is also known as counter bearings to employ a disc which is secured against axial displacement by a spring ring arranged in an annular groove provided at the end of the pedal axle. These heretofore known customary pedal designs require a special pedal axle for each type of journalling of the tread part.

It is, therefore, an object of the present invention to reduce the number of the heretofore customary designs for pedal axles and also to reduce the number of individual parts necessary to thereby considerably simplify the construction of the pedals and the manufacture of such pedals.

This object and other objects and advantages of the invention will appear more clearly from the following specification in connection with the accompanying drawing, in which.

Figure 1:
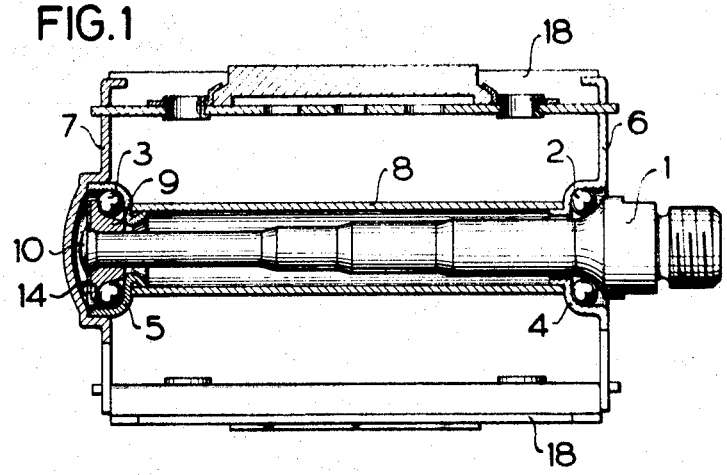
FIG. 1 is a top view and partially a section of a pedal with two ball bearings.

The pedal according to the present invention is characterized primarily in that the pedal axle is so designed that it can be employed for ball bearings as well as for friction bearings. A pedal construction according to the invention can be produced in a simple manner and can be realized, for instance, by providing the end portion of the pedal axle which is reduced in diameter with a rivet head or an upset or headed portion which retains the counter bearing placed on the axle end of the pedal.

For purposes of simplifying the assembly of the pedal it is suggested to combine the pedal axle with the pedal sleeve and the two bearings so as to obtain a single structural unit which will be held together by the rivet head or the upset portion. The head or upset portion provided on the axle end portion which is reduced in diameter may, for instance, be formed by beads which in radial direction are directed outwardly and which support the mounted counter bearing in the form of an annular shoulder. Another possibility consists in forming the upset portion by a plurality of small round depressions arranged coaxially with regard to the central axis of the pedal.

A still further embodiment of the invention consists in that the bearing provided on the crank side of the pedal is formed by a ball bearing while the bearing arranged at the end portion reduced in diameter of the pedal axle is formed by a friction bearing. Such a construction considerably improves the life of the pedal according to the invention over that of pedals which have only friction bearings. Preferably, the friction bearing is inserted into the pedal sleeve by means of a bearing bushing which bearing bushing is provided with a formed-on rim by means of which it is retained by the pedal sleeve and the lateral member.

Referring now to the drawing in detail, the invention is illustrated by way of a sport pedal the tread part of which is journalled on a pedal axle 1. The tread part comprises the two lateral members 6 and 7 having the tread strips 18 connected thereto.

FIG. 1 illustrates a pedal design with two ball bearings 2 and 3, according to which the ball race cup 4 of the ball bearing 2 forms a single integral part with the lateral part 6. However, if desired, the ball race cup 4 may form a separate part and may be inserted into the lateral member 6. The lateral member 7 which covers up or closes the open side of the ball bearing 3 rests by means of a cylindrical depression 14 on the outer rim of the ball race cup 5. Both cups 4 and 5 are interconnected by the pedal sleeve 8 and are held in a predetermined spaced relationship to each other by means of a cone 9 which serves as counter bearing and which is connected to the pedal axle 1 by means of an upset rivet head 10. As will be seen from the drawing, by means of the upset rivet head 10 the two ball bearings 2 and 3 are united with the pedal sleeve 8 and the pedal axle 1 to a structural unit.

Figure 2:
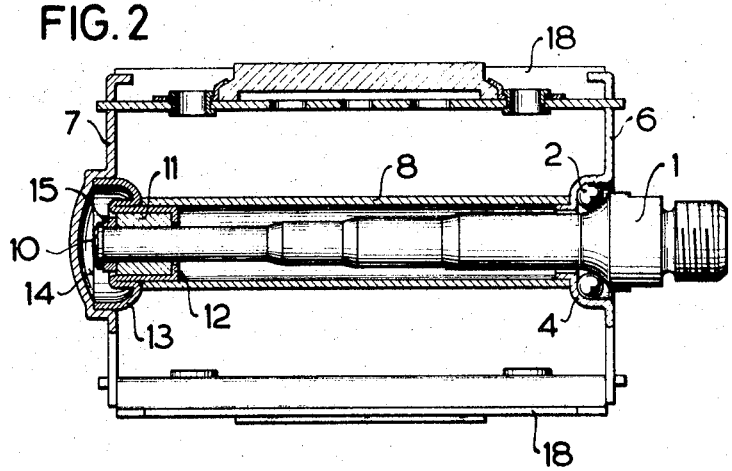
FIG. 2 is a top view and partially a section of a pedal with one ball bearing and one friction bearing.

According to the pedal illustrated in FIG. 2, that end of the pedal axle 1 which is reduced in diameter over the remaining portion of the axle 1 forms a friction bearing 11. This friction bearing 11 is by means of a bearing bushing 12 inserted into the pedal sleeve 8. The extent of the depth of the bearing bushing 12 is limited by a formed-on rim 13 supporting the lateral member 7.

The bearing bushing 12 is pressed against the pedal sleeve 8 and is secured against accidental turning by the lateral member 7. As counter bearing there is employed a disc 15 which is placed onto the reduced end portion of the pedal axle 1 where it is retained by means of a formed-on rivet head 10. Also with this pedal design the ball bearing 2 and the friction bearing 11 form a single structural unit with the pedal sleeve 8 and the pedal axle 1.

Figure 3:
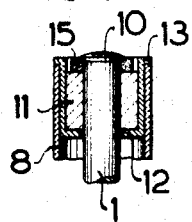
FIG. 3 illustrates a longitudinal section through the connection of the counter bearing by means of a rivet head.
Figure 4:
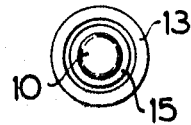
FIG. 4 is a plan view of FIG. 3.

FIGS. 3 and 4 illustrate the journalling of the pedal by means of a friction bearing 11. According to this embodiment, the disc 15 which serves as counter bearing is connected to the pedal axle 1 by means of an upset rivet head 10.

Figure 5:
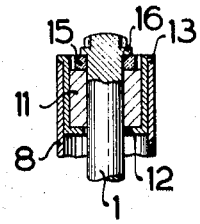
FIG. 5 represents a longitudinal section through the connection of the counter bearing by means of upset or headed beads.
Figure 6:
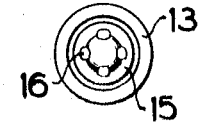
FIG. 6 is a plan view of FIG. 5.

Another possibility of connecting the disc 15 is shown in FIGS. 5 and 6. According to this embodiment, the upset portion provided at the reduced end portion of the pedal axle 1 is realized by means of a press ram which presses the material of the pedal axle 1 radially outwardly in such a way that beads 16 are formed supporting the disc 15 serving as counter bearing.

Figure 7:
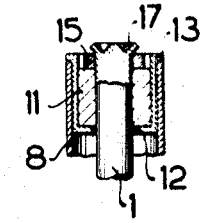
FIG. 7 is a longitudinal section through the connection of the counter bearing by means of small round depressions.
Figure 8:
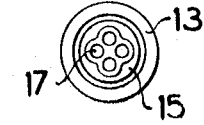
FIG. 8 is a plan view of FIG. 7.

A further connecting possibility is illustrated in FIGS. 7 and 8 according to which the disc 15 serving as counter bearing is by means of an upset portion connected to the pedal axle 1 which portion is formed by small round depressions 17 coaxially arranged with regard to the central axis of the pedal.

With pedals having a ball bearing journalled tread part, the cone 9 forming the counter bearing may be connected to the pedal axle in a manner similar to that described in connection with FIGS. 3 to 8.

The advantages realized according to the present invention may be briefly summarized by stating that instead of a plurality of different pedal axle designs, it will suffice to have in stock only one single design. Those parts of the pedal which serve for journalling the tread part are together with the pedal axle combined to an independent structural element and, therefore, can be built into tread parts of various designs, for instance, for ladies' and men's bicycles, and for frame and block pedals, regardless of whether ball bearings or friction bearings are employed in connection with the pedals.

It may be added that the diameter of the reduced diameter portion of the pedal axle will preferably be so selected that it corresponds to the inner diameter of most commercially available sleeve members 11 suitable for friction bearings, or to the inner diameter of commercially available cone members 9.

It is, of course, to be understood that the present invention is, by no means, limited to the specific embodiments shown in the drawing but also comprises any modifications within the scope of the appended claims.

What I claim is:

1. A pedal for bicycles and similar vehicles, which includes: a pedal axle, frame means surrounding said pedal axle, tread means carried by said frame means and permitting a foot to rest thereon, and bearing means respectively arranged on the end portions of said pedal axle and interposed between the latter and said frame means, said axle having at least one end portion designed for selectively accomodating an antifriction or a friction bearing, one end portion of said axle having a diameter considerably less than the diameter of the other end portion of said pedal axle and having its outer end provided with a head retaining the respective bearing carried by said end portion in firm connection to the latter.

2. A pedal for bicycles and similar vehicles, which includes: a pedal axle, frame means surrounding said pedal axle, tread means carried by said frame means and permitting a foot to rest thereon, and bearing means respectively arranged on the end portions of said pedal axle and interposed between the latter and said frame means, said axle having at least one end portion designed for selectively accomodating an antifriction or a friction bearing, a pedal sleeve arranged between said bearing means on said axle end portion and surrounding said pedal axle, the outer end of one of said end portions being provided with a head holding said axle and said sleeve and said two bearing means together so as to form a single structural unit therewith.

3. A pedal according to claim 1, in which said one end portion of reduced diameter has radially upset bead means engaging the adjacent one of said bearing means so as firmly to retain the same on said axle.

4. A pedal according to claim 1, in which the outer end of said diameter reduced end portion of said axle has an upset portion formed by a plurality of small round depressions arranged along a circle around and coaxial with said axle.

5. A pedal according to claim 1, which includes a friction bearing on the reduced diameter portion of the axle and has an antifriction bearing on the other end portion of said axle.

6. A pedal for bicycles and similar vehicles, which includes: a pedal axle, frame means surrounding said pedal axle, tread means carried by said frame means and permitting a foot to rest thereon, and bearing means respectively arranged on the end portions of said pedal axle and interposed between the latter and said frame means, said axle having at least one end portion designed for selectively accomodating an antifriction or a friction bearing, one of said bearing means being a friction bearing comprising a bearing bushing, and including axle bushing means interposed between and bracing said two bearing means relative to each other while having said bearing bushing received therein.

7. A pedal according to claim 6, in which said bearing bushing has an axially outwardly extending bowl-shaped portion clamped in by an adjacent portion of said frame means on one hand and by the adjacent end of said axle bushing on the other hand.

8. A pedal for bicycles and similar vehicles, which includes: a pedal axle, frame means surrounding said pedal axle, tread means carried by said frame means and permitting a foot to rest thereon, and bearing means respectively arranged on the end portions of said pedal axle and interposed between the latter and said frame means, said axle having at least one end portion designed for selectively accomodating an antifriction or a friction bearing, one end portion of said frame means forming an outer race ring for an antifriction bearing mounted on the adjacent axle portion and forming one of said bearing means, and the other end portion of said frame means forming a cover covering up the other one of said bearing means, said other one of said bearing means comprising a bearing element having a bowl-shaped section resting in said cover, a pedal sleeve surrounding said pedal axle and being braced against said outer race ring and said bowl-shaped section.

* * * * *